(12) United States Patent
Levy

(10) Patent No.: US 7,229,552 B1
(45) Date of Patent: Jun. 12, 2007

(54) WATER PURIFICATION APPARATUS AND SYSTEM

(75) Inventor: Ehud Levy, Roswell, GA (US)

(73) Assignee: Selecto, Inc., Suwanee, GA (US)

( * ) Notice: Subject to any disclaimer, the term of this patent is extended or adjusted under 35 U.S.C. 154(b) by 309 days.

(21) Appl. No.: 10/723,271

(22) Filed: Nov. 26, 2003

(51) Int. Cl.
*B01D 27/02* (2006.01)

(52) U.S. Cl. ..................... 210/266; 210/282

(58) Field of Classification Search ............... 210/266, 210/282
See application file for complete search history.

(56) References Cited

U.S. PATENT DOCUMENTS

| | | | |
|---|---|---|---|
| 3,950,251 A * | 4/1976 | Hiller | 210/232 |
| 4,654,142 A * | 3/1987 | Thomsen et al. | 210/232 |
| 5,338,458 A * | 8/1994 | Carrubba et al. | 210/668 |
| 5,609,759 A * | 3/1997 | Nohren et al. | 210/266 |
| 6,524,477 B1 * | 2/2003 | Hughes | 210/282 |
| 2001/0042719 A1 * | 11/2001 | Levy | 210/660 |
| 2004/0060873 A1 * | 4/2004 | Yanou et al. | 210/660 |

* cited by examiner

*Primary Examiner*—Duane Smith
(74) *Attorney, Agent, or Firm*—Buchanan Ingersoll & Rooney PC

(57) ABSTRACT

The invention relates to a two-stage design for a water purification system, with water to be purified first passing through a first stage containing particulate filtration media, and a second stage containing a porous filtration block. The particulate filtration media can be the same as, or different from, material included in the porous block. Either material may be any material that removes contaminants from water by, e.g., absorption, adsorption, ion exchange, sequestration, or other mechanism, or any combination of these.

14 Claims, 2 Drawing Sheets

WATER PURIFICATION APPARATUS AND SYSTEM

BACKGROUND OF THE INVENTION

1. Field of the Invention

This invention relates to apparatus and systems for efficient and effective purification of water to provide improved pressure drop characteristics and capacity as compared to purification systems using conventional carbon blocks.

2. Description of Related Art

Water filtration media containing extruded or molded carbon blocks (particles of granulated activated carbon held together formed into a desired shape and held together with a polymeric binder) have been known in the art. For instance, U.S. Pat. Nos. 5,189,092; 5,249,948; and 5,331,037 disclose carbon blocks used to purify water prepared by extruding carbon particles with a polymeric resin.

These conventional carbon blocks, while functional, present several disadvantages in use. First, the capacity of the blocks is limited by the kinetics of adsorption onto the carbon surfaces and into the pores of the bound carbon particles. Because so much of the surface area of the carbon particles is occluded by binder resin, the capacity of filters of reasonable size and number to treat water is rather limited in terms of volumetric flow rate. In addition, the total volume of water treated is limited because of clogging of the filter due to the presence of small particulates and other detritus in the water being filtered, as well as because of the saturation of the limited number of active sites on the carbon particulate.

Second, both the volumetric flow rate and the total volume of water treated can be limited by the structural integrity of the carbon block. Many conventional carbon blocks degrade over a fairly short period of time as the flow of water erodes them, breaking them into smaller blocks that can move around in the flow system and cause clogging.

Third, carbon blocks, in particular extruded carbon blocks, can be difficult to manufacture with high consistency, leading to unpredictable performance results. The binder resins must be heated, either directly or by shear in an extruder, which can passivate some of the carbon, rendering the blocks less effective.

Fourth, existing carbon block formulations are not particularly effective at removing chloramines, rendering them less than desirable for use in water purification systems used in the food processing industry. In particular, catalytic carbonaceous chars can be used for chloramine removal, as disclosed in U.S. Pat. No. 6,342,129, the entire contents of which are incorporated herein by reference. However, the inventor has found that including this material in a carbon block results in a substantial amount of deactivation of the catalytic activity of the carbon, believed to result from the need to heat the binder resin to form the carbon block.

Moreover, chloramine reduction is very complex to achieve by carbon block filters made from regular granulated activated carbon, be it molded or extruded, etc. For example, extruded carbon block can remove chlorine with one pound of highly activated coconut shell carbon at a flow rate of approximately 2 gpm with 80×325 mesh carbon particles and 15% polymeric binder for approximately 7,000 gallons to meet NSF Standard 42 at 2 ppm influent chlorine and 0.5 ppm effluent. Where the same filter needs to reduce chloramine at 2 ppm, its capacity is barely 200 gallons at the same flow rate.

Special catalytic carbons have been developed to remove chloramine, but when they have been molded or extruded into carbon block, they lose 90% of their efficiency for chloramines removal. Different carbons have different adsorption capacities; however, coconut shell carbon, coal based carbon and other nut-derivative materials all demonstrate a ratio of 20:1 or 30:1 capacity between their ability to remove chlorine and their ability to reduce chloramine.

Water pH is also a factor in the effectiveness of the chloramines removal media. The pH of chloramine in water is extremely high, generally between about 8.5 and about 9.6. At this pH level, most carbon loses its removal efficiency quite rapidly, if not immediately. Since a water filter requires a minimum amount of water flow to function effectively and economically, the size of the filter becomes critical. With regular carbon, to achieve chloramine reduction at the same capacity as chlorine with the same filter, a sufficiently long contact time is needed such that the filter must be about 10 to about 20 times larger than is necessary if only chlorine is to be removed.

Carbon block filtration results in other disadvantages as well. It is often difficult to prepare carbon blocks with adequate control over the particle size of the particulate carbon used to make the blocks. This can result in the use of carbon containing significant quantities of dust, which can migrate through the carbon block, clog pores, and create unduly large pressure drops through the block, which can block as much as 50% to 90% of the rated flow rate through the filter block. Plugging of the filter also creates inconsistencies in water flow. Carbon made from coconut shell, in particular, can swell in the presence of VOC, further constricting fluid flow and increasing pressure drop.

An alternative to carbon block technology is the use of granulated carbon and other filtration media, generally having a particle size distribution ranging from about 50 mesh to about 28 mesh, in a canister through which the water to be purified flows. Again, while this arrangement is functional, particularly when coupled with a downstream carbon block purification step, the capacity of the system is generally limited to around 6,000 to 7,000 gallons.

Accordingly, there remains a need in the art for a water purification apparatus and system that does not suffer from the disadvantages of carbon block based systems, that can purify water at high capacity, and that can be adapted to effectively remove chloramines from water. In addition, there remains a need for an essentially modular system, which provides effective water purification through the use of a single cartridge, yet which provides sufficient flexibility in manufacture that different filtration media can be used without multiplying the inventory of parts needed to produce the system.

SUMMARY OF THE INVENTION

The invention described in this application avoids the disadvantages encountered with available carbon block filtration, and is particularly well suited to chloramine removal.

The invention uses a two-stage design, with water to be purified first passing through a first stage containing particulate filtration media, and a second stage containing a porous filtration block. The particulate filtration media can be the same as, or different from, material included in the porous block. Either material may be any material that removes contaminants from water by, e.g., absorption, adsorption, ion exchange, sequestration, or other mechanism, or any combination of these.

In one embodiment, the invention relates to a purification system wherein the first stage contains particulate purification media, e.g., catalytic carbon, having an average particle size of approximately 50 to approximately 200 mesh, disposed in a porous shell that allows water to enter the device and contact the purification media. The porous shell itself functions as a "pre-filter", and desirably contains a material having a micron rating of approximately 20 to approximately 80, in order to exclude some particulate matter from the interior of the filtration system.

After leaving the first stage, the water contacts a porous block, which can be made by extrusion molding or by other polymer processing. The block contains purification material, such as active carbon, which has an average particle size ranging from about 80 to about 325 mesh. Without wishing to be bound by any theory, it is believed that the ability of the particulate purification material in the first stage to reduce contaminants, such as chloramines, by approximately 60% to approximately 99% allows the porous block in the second stage to complete the reduction of contaminant to even lower levels. With the use of catalytic carbon in the first stage and carbon block in the second stage, chloramines can be reduced to levels that are not detectable using conventional detection equipment or techniques.

Moreover, by careful selection of the particle size of the purifying media in the first stage, a system can be obtained that is 99% dust free. This allows water to flow through the purification system with much lower pressure drops than are achievable with existing systems. In addition, the selection of particle size ranges for the first stage results in very high removal kinetics with particular purification materials, such as catalytic carbon.

BRIEF DESCRIPTION OF DRAWINGS

FIG. 1 shows one embodiment of a cartridge according to the invention.

DETAILED DESCRIPTION OF SPECIFIC EMBODIMENTS

Figure 1A:
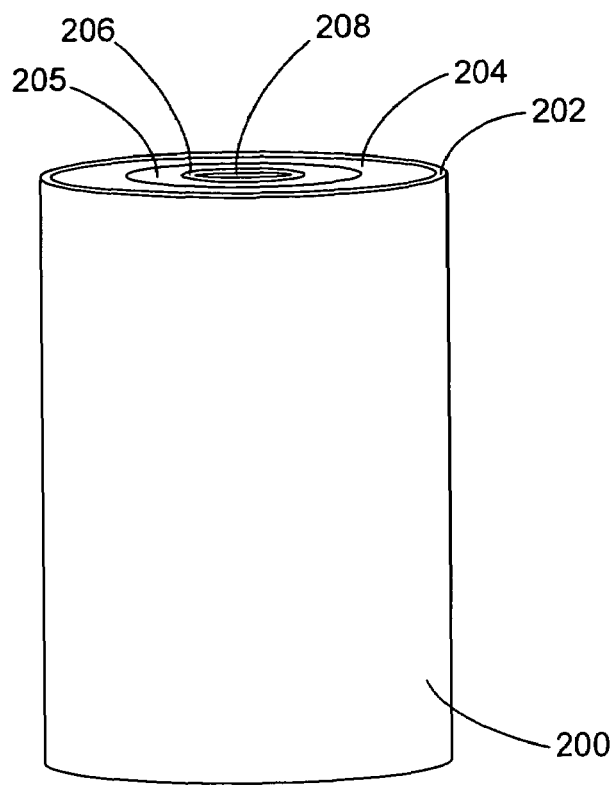
FIG. 1A shows a perspective view of this embodiment of the cartridge.

In order to obtain the particular advantages described above, selection of an appropriate particle size distribution of particulate purification material is important. While other ranges can be made to work, it has been found that a range of about 50 to about 200 mesh is particularly suitable, and will attain all of the advantages described above. Substantially coarser particles such as 20×50 or 50×80 mesh, provide insufficient surface area, effectively decreasing the contact time of the water with the carbon surface for a given flow rate. As a result, reduction of chloramine is below what it could be with particle sizes in the range described above. Using particle sizes significantly smaller than the range described above risks passing the particles on to the porous block, where they can clog pores and reduce system efficiency, or of passing the particles into the system effluent.

The first stage of the filter can contain particulate purification material similar to that used in the porous block, but without the use of binder. Disposition of the powder within the porous shell creates a compacted fine filter without any binder to hold the particles together or to obstruct or cover any of the particle surface. This arrangement allows water to flow through the porous material past the particles with a pressure drop as low as below 6%. The material used as the central core of the system (i.e., a porous block) depends on the micron rating, and may have additional pressure drop of 10%.

The particulate purification material used in the first stage can be carbon, in particular, activated carbon, more particularly, activated catalytic carbon. Examples of suitable activated catalytic carbon include Calgon Centaur carbon, or AquaGuard carbon made by MeadWestVaco. The activated carbon may also be based on (i.e., prepared from using known techniques for preparing activated carbon) wood ("wood-based carbon") or coal ("coal-based carbon"), or some combination thereof.

Other materials usable in the same range of particle sizes include metal oxides and hydroxides, such as zirconium hydroxide, zirconium oxide, titanium oxide and magnesium hydroxide. Any of these materials can be used in conjunction with a 50×200 mesh porous carbon block in the second stage.

The ability of the water to flow through hydroxides and oxides, such as zirconium hydroxide and zirconium oxide, without binder to hold the material together against the radial flow improves the kinetics of arsenic reduction by a factor as high as 60:1. Using current NSF arsenic reduction test protocols at pH of 8.5 and 6.5, two gallons of water per minute can pass through the two stage filter and reduce of arsenic to non-detectable levels for approximately 1,600 gallons. The method for improving fluid flow with small particles without bypass is believed to provide turbulent flow near the particles so that the purification process maintains very high kinetics. The second stage functions mainly to further reduce levels by removing material remaining after treatment in the first stage. Combined, the two stages maximize efficiency, and provide a level of purification that cannot be achieved using either stage separately, or using both stages in a different configuration.

The porous material used to make the outer layer of the filter can desirably be polypropylene or polyethylene, preferably high-density polyethylene, even more preferably GUR type made by Ticona. GUR polymer is a very porous and makes a hydrophilic shell that allows water to flow through the plastic with almost no resistance. Since the powder media has been packed by vibration, vacuum or wet packing, there is almost no void space between the particles. The invention design of the cartridge also filters gases, air and toxic fumes, where if the material were molded, there would be no kinetics.

Figure 1B:
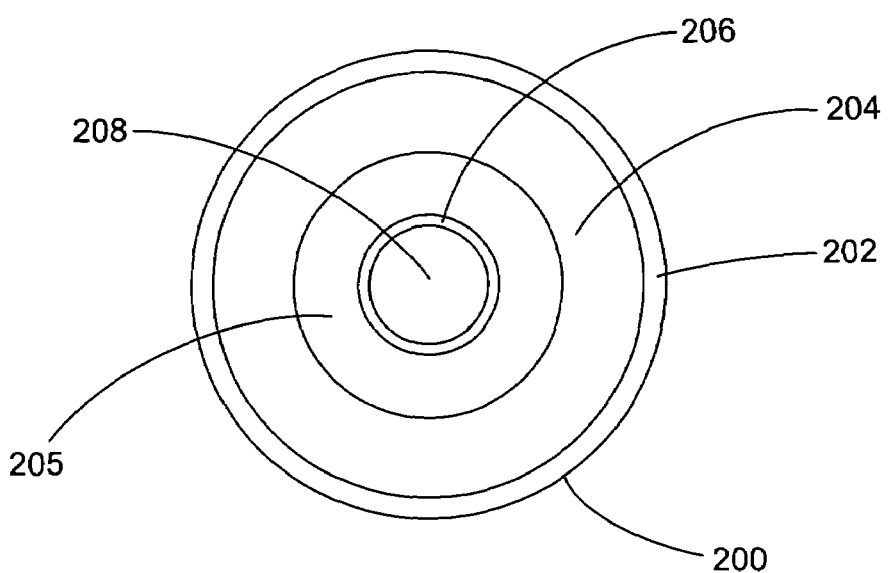
FIG. 1B shows a top view of the same cartridge embodiment.
Figure 1C:
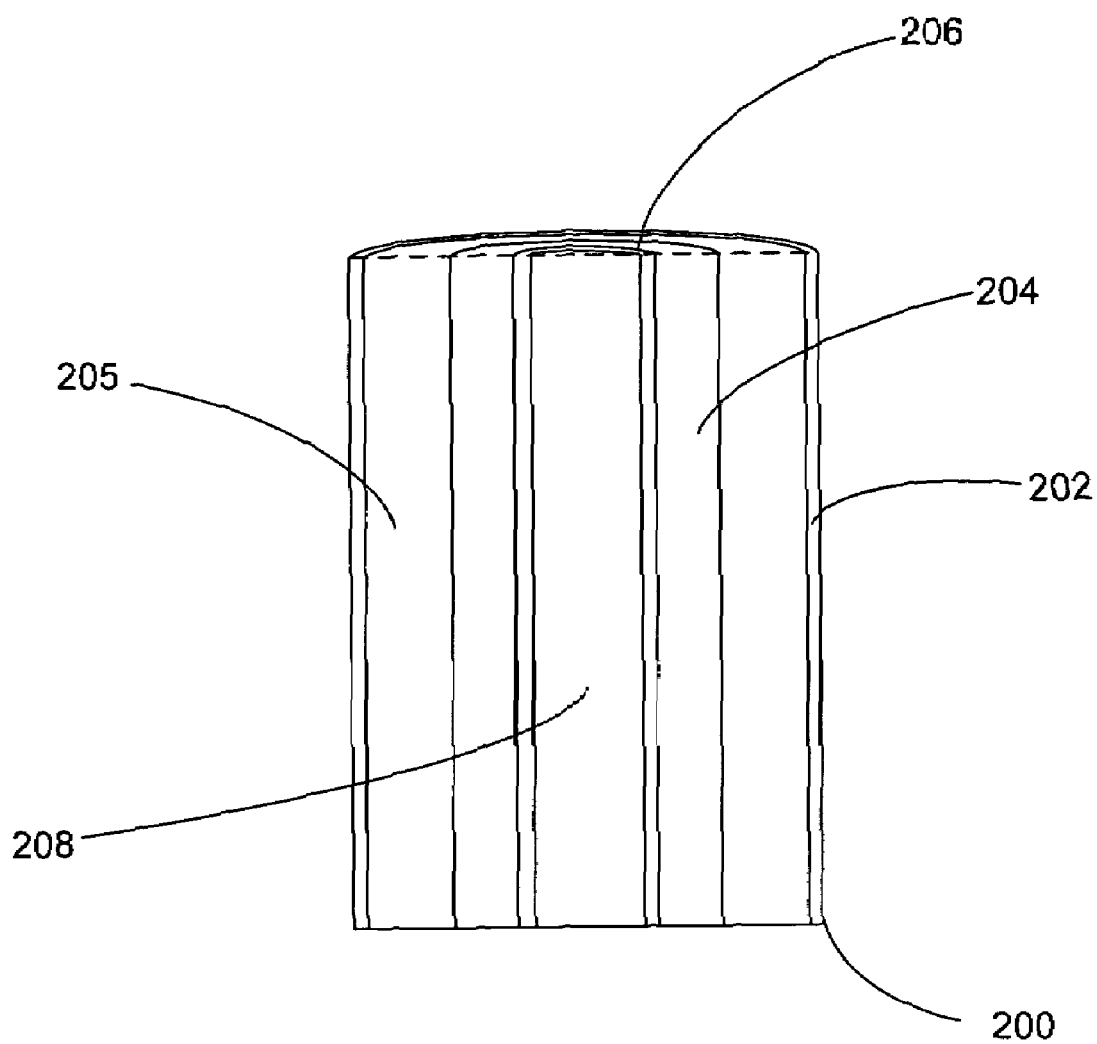
FIG. 1C shows a cross-sectional perspective view of the cartridge of FIGS. 1A and 1B.

In one embodiment, the invention relates to a cartridge for inclusion in water purification systems, illustrated in FIG. 1. The cartridge is shown in a cylindrical shape for ease of illustration and description. Those of skill in the art will understand that other geometries are possible, and that altering the geometry of the cartridge does not avoid use of the inventive concepts disclosed herein. If the water must first pass through a granular or powdered purification media and then pass through a porous purification block, this is generally sufficient to realize the advantages of the invention. Additional advantages are realized when the water must first pass through a porous layer prior to encountering the granular or powdered purification media, or if the powdered purification media is separated from the porous purification block by a porous layer, or if the porous purification block contains activated carbon, or if all of these features are combined.

The cartridge 200 has an outer porous layer 202, an optional inner porous layer 206, a porous purification block 205, and an annular space 204 between the outer porous layer 202 and the porous purification block 205, containing a finely ground powdered purification media. The outer and inner porous layers 202, 206, are generally polymeric materials (and need not be the same material) that are sufficiently porous that they are capable of allowing water to pass through them, but not so porous that significant quantities of the purification media powder can escape. The purification media powder has desirably been packed to high density by, e.g., vibrational filling techniques. In this embodiment of the device, water to be purified passes through the outer porous layer 202, contacts the powdered purification media in the annular cavity 204, then contacts the porous filtration block 205, and then passes through the optional inner layer 206, and exits the device through inner annular opening 208, and may optionally be subjected to further purification steps.

The purification media powder used in the cartridge desirably has a particle size distribution ranging from about 375 mesh to about 50 mesh, more particularly from about 375 mesh to about 80 mesh, even more particularly from about 200 mesh to about 50 mesh. The mean particle size can generally be found at a point that is between about 36% and about 85% of the particles in the distribution (i.e., between a particle size where about 36% of the particles in the distribution are smaller than that size, and a particle size where about 85% of the particles in the distribution are smaller).

The powdered purification media used can vary depending upon the type of purification desired, and the impurities present in the water to be purified. Metal hydroxides, metal oxides and carbon coated with these materials can be advantageously used. Examples include powdered zirconia, powdered alumina, powdered activated carbon, powdered catalytic char, powdered zeolite, and powdered silicates. The purification media is introduced into the cavity and packed to a density ranging from about 0.2 g/cc to 1.3 g/cc. using vibrational filling techniques with high frequency vibration to minimize void spaces in the material. Pneumatic or magnetic vibration tables are suitable in this regard. These are operated until the material has settled to a predetermined height and weight (i.e., the desired density).

In one embodiment of the invention, which is particularly suitable for removing arsenic from water, zirconia having a particle size distribution between about 40 µm and about 250 µm can be used as the powdered purification media.

In another embodiment of the invention, which is particularly suitable for use in removing chloramines from water, the powdered purification media used in the cartridge described above can be an activated carbon having a particle size in the range of about 50 mesh to about 200 mesh. In an even more particular embodiment for chloramines removal, the powdered purification media can be a carbon that is catalytically active in degrading chloramines. An example of such a powder is that disclosed in U.S. Pat. No. 6,342,129, but catalytic carbon powders prepared by other methods can also be used to advantage in the cartridge, provided that they have particle size distributions in the ranges described above, and they can catalytically decompose at least a portion of the chloramines with which they come into contact. This embodiment of the cartridge can desirably be coupled with carbon block purification, which may be formed from coconut shell carbon and a polymeric binder, such as those known in the art.

Other possibilities for powdered purification materials include spray dried agglomerates of particles described in U.S. Ser. No. 10/681,597, filed Oct. 8, 2003.

After passing through the powdered purification media, the treated water is then forced through a porous filtration block. The porous filtration block generally has a micron rating ranging between about 0.5 to 10 micron. The porous filtration block may be carbon block (activated carbon bonded together with a polymeric binder), e.g., of the type described in published U.S. Patent Application Nos. 2001-0042719, published Nov. 22, 2001 and 2002-0195407, published Dec. 26, 2002, and in U.S. Ser. No. 10/445,410 filed May 27, 2003. Alternatively, the porous filtration block may be a porous polymer block, such as a block of high density polyethylene (HDPE). In particular, HDPE having low melting index and high hydrophilicity is particularly suitable. One such HDPE is GUR polyethylene (Ticona). An alternative the block may be low density polyethylene, which can be molded or extruded. The carbon particles used in the carbon block may be of the same type as disclosed above for use in the powdered purification material.

In a particular embodiment of the invention, the components described above are combined into a single cartridge, leading to ease of handling by the user. An annular cavity is formed into which the powdered purification media is packed. The inner surface of this annular cavity may be formed by the outer surface of the porous filtration block, or may be formed from a porous polymeric membrane that is in contact with the porous filtration block. The outer surface of the annular cavity is formed from a porous layer, desirably a porous HDPE, such as the GUR polyethylene described above. This material can also have a micron rating in the 10 to 200 range, although all that is necessary for proper functioning of the cartridge is that the porous layer be sufficiently porous to admit the desired flow rate of water, while the pores are sufficiently small that the media is retained within the annular cavity.

The cartridge can be used in a housing piped into a water purification system, as is known in the art. For example, the cartridge can be disposed in a housing that depends from a piping system, and which contains an inlet supplying water to be treated. The housing surrounds the cartridge, so that water is forced through the outer surface of the height of the cylindrical cartridge, passes through the porous layer, then through the powdered purification media, then through any intermediate layers, then through the porous filtration block. The purified water then leaves the porous filtration block, passes through any final porous layers, and enters the inner annular opening through which it exits the cartridge. The exiting water then passes through an outlet in the housing, which is in fluid communication with the inner annular opening.

EXAMPLES

The invention can be more clearly understood with respect to the following non-limiting examples.

Example 1

A 4.5 inch diameter shell made of porous GUR HDPE (Ticona) having a bulk density of 0.93 g/cc and a porosity of 20 micron was filled with a 50×200 mesh mixture of zirconium oxide and zirconium hydroxide. The center core of the filter was a 2 inch diameter carbon block made from coconut shell carbon having a diameter of 80×325 mesh, with 20% HDPE binder, which was formed from Ticona GUR HDPE.

The carbon block was adhered to the porous shell, and the zirconium oxide-containing media introduced and the assembly vibrated until the level of particulate was the same as the level of the central core. A cap was then affixed to the top of the shell, sealing the media in the annular space between the core and the shell.

Example 2

The procedures described in Example 1 were followed, except that the zirconium oxide-containing media was replaced by activated carbon particles, specifically, 0.7 lb. of 50×200 mesh AquaGuard carbon particles were inserted into the annular gap between the carbon block and the outer shell.

Example 3

The purification cartridge of Example 1 was tested for arsenic removal from water. Challenge water containing about 50 ppb As at pH of 8 was cycled through the cartridge using a duty cycle of 15 minutes on and 15 minutes off, and a flow rate of about 2 gpm. Water from the influent and effluent streams were sampled at the beginning of the test, and again after the indicated volume of water had been processed through the purification apparatus. The arsenic levels of the samples were measured by atomic adsorption. The results are presented in Table 1 below. "N.D." indicates levels that were undetectable.

TABLE 1

| Volume (gal.) | Flow rate (gpm) | Effluent As (ppb) | Influent As (ppb) |
|---|---|---|---|
| Start | 2.0 | N.D. | 53 |
| 200 | 2.1 | N.D. | 52 |
| 400 | 2.3 | N.D. | 55 |
| 600 | 2.0 | N.D. | 49 |
| 800 | 2.1 | N.D. | 50 |
| 1000 | 2.1 | N.D. | 52 |
| 1200 | 2.0 | N.D. | 49 |
| 1400 | 2.0 | 2.50 | 54 |
| 1600 | 2.0 | 9.80 | 47 |

As is apparent, even with a high volumetric flow rate, and significant influent arsenic composition, the filtration cartridge and method of the invention is extremely effective at removing arsenic from water, and it is not until relatively large volumes of water have been processed that the media becomes saturated and small arsenic residuals become detectable in the water.

Example 4

The purification cartridge of Example 2 was tested for removal of chloramine. Challenge water containing about 3.0 ppm chloramines at pH of about 9 was cycled through a purification cartridge using a duty cycle of 10 minutes on and 10 minutes off. Water from the influent and effluent streams were sampled and their chloramines levels measured by Hack spectrometer for chloramine. The results are presented in Table 2 below. Again, the sampling occurred after the indicated volume of water had passed through the device.

TABLE 2

| Volume (gal.) | Flow rate (gpm) | Effluent chloramines (ppm) | Influent choramine (ppm) |
|---|---|---|---|
| Start | 2.2 | 0.01 | 2.90 |
| 1500 | 2.2 | 0.01 | 2.95 |
| 2000 | 2.3 | 0.01 | 3.04 |
| 4000 | 2.4 | 0.01 | 3.10 |
| 6000 | 2.3 | 0.01 | 3.25 |
| 8000 | 2.3 | 0.00 | 2.98 |
| 10000 | 2.2 | 0.01 | 3.08 |
| 12000 | 2.2 | 0.18 | 3.05 |
| 14000 | 2.1 | 0.30 | 3.22 |
| 16000 | 2.1 | 0.49 | 2.92 |

The experiment indicates that, even at high flow rates, levels of chloramines do not begin to rise above virtually undetectable levels until after large volumes of water (12,000 gal.) have been processed through the apparatus.

What is claimed is:

1. A water purification cartridge, comprising:
   (a) a first porous layer having an inner surface and an outer surface;
   (b) a porous purification block having an outer surface and an inner surface, and at least partially enclosed by the first porous layer;
   (c) a cavity between the inner surface of the first porous layer and the outer surface of the porous purification block and in fluid communication with the porous purification block; and
   (d) a powdered purification media comprising catalytic char disposed within the cavity, wherein the powdered purification media has a particle size distribution ranging from about 50 mesh to about 375 mesh.

2. The water purification cartridge of claim 1, wherein:
   the first porous layer is sufficiently porous to allow water to flow from its outer surface through the porous layer to its inner surface, but not sufficiently porous to allow significant quantities of powdered purification media to pass from the inner surface, through the porous layer, to its outer surface.

3. The water purification cartridge of claim 1, wherein the powdered purification media has a particle size distribution ranging from about 80 mesh to about 325 mesh.

4. The water purification cartridge of claim 1, wherein the powdered purification media has a particle size distribution ranging from about 50 mesh to about 200 mesh.

5. The water purification cartridge of claim 1, wherein the powdered purification media has a particle size distribution ranging from about 40 μm to about 250 μm.

6. The water purification cartridge of claim 1, wherein the porous filtration block comprises activated carbon disposed in a polymeric binder.

7. The water purification cartridge of claim 1, wherein the porous filtration block comprises a porous polymeric block.

8. The water purification cartridge of claim 7, wherein the porous polymeric block comprises a porous high density polyethylene block or a porous low density polyethylene block.

9. The water purification cartridge of claim 8, wherein the high density polyethylene block has a micron rating ranging between about 0.5 and about 10.

10. The water purification cartridge of claim 1, wherein the first porous layer comprises a porous high density polyethylene layer.

11. The water purification cartridge of claim 1, further comprising a second porous layer disposed adjacent to the inner surface of the porous filtration block, and in fluid communication with the porous filtration block.

12. The water purification cartridge of claim 1, wherein the packed density of porous purification material ranges from about 0.2 g/cc to about 1.3 g/cc.

13. A water purification cartridge, comprising:
(a) a first porous layer having an inner surface and an outer surface;
(b) a porous purification block having an outer surface and an inner surface, and at least partially enclosed by the first porous layer, wherein the porous polymeric block comprises a porous high density polyethylene block or a porous low density polyethylene block having a micron rating ranging between about 0.5 and about 10;
(c) a cavity between the inner surface of the first porous layer and the outer surface of the porous purification block and in fluid communication with the porous purification block; and
(d) a powdered purification media comprising catalytic char disposed within the cavity.

14. A water purification cartridge, comprising:
(a) a first porous layer having an inner surface and an outer surface;
(b) a porous purification block having an outer surface and an inner surface, and at least partially enclosed by the first porous layer;
(c) a cavity between the inner surface of the first porous layer and the outer surface of the porous purification block and in fluid communication with the porous purification block; and
(d) a powdered purification media comprising catalytic char disposed within the cavity, wherein the packed density of porous purification material ranges from about 0.2 g/cc to about 1.3 g/cc.

* * * * *